US009359766B2

United States Patent
Shiao et al.

(10) Patent No.: US 9,359,766 B2
(45) Date of Patent: Jun. 7, 2016

(54) SYSTEM, METHOD AND APPARATUS FOR THERMAL ENERGY MANAGEMENT IN A ROOF

(75) Inventors: Ming L. Shiao, Collegeville, PA (US); Husnu M. Kalkanoglu, Swarthmore, PA (US); Gregory F. Jacobs, Oreland, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 13/440,762

(22) Filed: Apr. 5, 2012

(65) Prior Publication Data

US 2012/0266553 A1    Oct. 25, 2012

Related U.S. Application Data

(60) Provisional application No. 61/477,941, filed on Apr. 21, 2011.

(51) Int. Cl.
*E04B 1/70* (2006.01)
*E04F 17/00* (2006.01)
(Continued)

(52) U.S. Cl.
CPC . *E04D 13/17* (2013.01); *B32B 3/10* (2013.01); *B32B 3/12* (2013.01); *E04D 13/1618* (2013.01);
(Continued)

(58) Field of Classification Search
CPC ..... E04B 1/7069; E04D 3/352; E04D 13/172; E04D 1/28; E04D 3/357; E04D 13/0648
USPC .................. 52/232, 302.3, 793.1, 794.1, 408; 428/172
See application file for complete search history.

(56) References Cited

U.S. PATENT DOCUMENTS 3,016,317 A * 1/1962 Brunner ........................ 428/138
3,319,392 A   5/1967 Fitzgerald
(Continued)

FOREIGN PATENT DOCUMENTS

CN    101922209 A    12/2010
WO    2011/045574 A1    4/2011
(Continued)

OTHER PUBLICATIONS

Jan Kosny, PhD et al. "Theoretical and Experimental Thermal Performance Analysis of Building Shell Components Containing Blown Fiberglass Insulation Enhanced with Phase-Change Material (PCM)" (13 pages).
(Continued)

*Primary Examiner* — Brian Mattei
*Assistant Examiner* — Paola Agudelo
(74) *Attorney, Agent, or Firm* — Abel Law Group, LLP; Alexander H. Plache (57) ABSTRACT

A roof product has a thermal heat storage layer, a vent layer with channels for transferring excess heat through a length of the roof product, and a flame retardant to suppress fire through the vent layer. These three materials form a unitary structure. The roof product may have a radiant layer, the thermal heat storage layer and the vent layer to form the unitary structure. The roof products are assembled in an abutting configuration on the roof of a building. The vent layer vents excess heat from an eave of the roof up to a ridge of the roof and out to atmosphere. The roof products manage thermal energy in the roof by storing thermal heat with the unitary roof product during a heating cycle; venting excess heat through the unitary product; and releasing the stored thermal heat from the unitary product into or out of the building during a cooling cycle.

7 Claims, 9 Drawing Sheets

(51) Int. Cl.
| | |
|---|---|
| *E04D 13/17* | (2006.01) |
| *E04D 13/16* | (2006.01) |
| *F24J 2/04* | (2006.01) |
| *F24J 2/34* | (2006.01) |
| *B32B 3/10* | (2006.01) |
| *B32B 3/12* | (2006.01) |

(52) U.S. Cl.
CPC .. *F24J 2/045* (2013.01); *F24J 2/34* (2013.01); *B32B 2419/06* (2013.01); *Y02B 10/20* (2013.01); *Y02E 10/44* (2013.01); *Y10T 428/24149* (2015.01); *Y10T 428/24331* (2015.01)

(56) References Cited

U.S. PATENT DOCUMENTS

| | | | |
|---|---|---|---|
| 3,445,322 A | | 5/1969 | Saiia et al. |
| 3,561,177 A | | 2/1971 | Agro et al. |
| 3,598,688 A | | 8/1971 | Bellamy |
| 3,958,385 A | | 5/1976 | Bondra, Jr. et al. |
| 4,023,321 A | * | 5/1977 | Smith ............... 52/553 |
| 4,163,445 A | * | 8/1979 | Stanger ............ 126/632 |
| 4,189,886 A | | 2/1980 | Frohlich et al. |
| 4,218,502 A | | 8/1980 | Graham et al. |
| 4,234,639 A | | 11/1980 | Graham |
| 4,244,353 A | * | 1/1981 | Straza ............ 126/622 |
| 4,310,587 A | | 1/1982 | Beaupre |
| 4,315,392 A | | 2/1982 | Sylvest |
| 4,326,631 A | | 4/1982 | Annand |
| 4,329,827 A | * | 5/1982 | Thorn ............ 52/790.1 |
| 4,351,873 A | * | 9/1982 | Davis ............. 428/198 |
| 4,428,360 A | * | 1/1984 | Cohen ............ 126/622 |
| 4,726,985 A | | 2/1988 | Fay et al. |
| 4,804,578 A | | 2/1989 | Crookston |
| 4,848,057 A | * | 7/1989 | MacDonald et al. ........ 52/518 |
| 4,931,340 A | * | 6/1990 | Baba et al. ........ 428/73 |
| 4,937,990 A | * | 7/1990 | Paquette .......... 52/199 |
| 4,943,185 A | | 7/1990 | McGuckin et al. |
| 5,067,298 A | | 11/1991 | Petersen |
| 5,069,950 A | | 12/1991 | Crookston, Sr. |
| 5,088,249 A | * | 2/1992 | Marzouki ........ 52/232 |
| 5,100,725 A | | 3/1992 | Pearson |
| 5,231,814 A | | 8/1993 | Hageman |
| 5,369,926 A | | 12/1994 | Borland |
| 5,373,674 A | * | 12/1994 | Winter, IV ........ 52/309.9 |
| 5,383,314 A | | 1/1995 | Rothberg |
| 5,473,847 A | * | 12/1995 | Crookston ........ 52/302.1 |
| 5,524,381 A | | 6/1996 | Chahroudi |
| 5,626,936 A | | 5/1997 | Alderman |
| 5,635,306 A | * | 6/1997 | Minamida et al. ........ 428/593 |
| 5,644,880 A | | 7/1997 | Lehnert et al. |
| 5,651,226 A | * | 7/1997 | Archibald ........ 52/518 |
| 5,770,295 A | | 6/1998 | Alderman |
| 6,006,481 A | | 12/1999 | Jacobs |
| 6,017,597 A | | 1/2000 | Minakami et al. |
| 6,061,978 A | | 5/2000 | Dinwoodie et al. |
| 6,308,482 B1 | | 10/2001 | Strait |
| 6,645,598 B2 | | 11/2003 | Alderman |
| 6,672,024 B2 | | 1/2004 | Alderman |
| 6,691,472 B2 | | 2/2004 | Hubert |
| 6,694,693 B2 | | 2/2004 | Alderman |
| 6,769,223 B2 | | 8/2004 | Alderman |
| 6,802,159 B1 | | 10/2004 | Kotler |
| 6,804,922 B1 | | 10/2004 | Egan |
| 6,877,288 B2 | * | 4/2005 | Shirota ............ 52/416 |
| 6,955,018 B2 | | 10/2005 | Alderman |
| 7,146,771 B2 | * | 12/2006 | Swann ............ 52/518 |
| 7,191,845 B2 | | 3/2007 | Loar |
| 7,540,118 B2 | * | 6/2009 | Jensen ............ 52/232 |
| 7,585,556 B2 | | 9/2009 | Julton |
| 7,604,536 B2 | * | 10/2009 | Coulton et al. ........ 454/365 |
| 7,618,310 B2 | | 11/2009 | Daniels |
| 7,641,812 B2 | | 1/2010 | Alderman |
| 7,698,858 B2 | | 4/2010 | Schroer et al. |
| 7,703,254 B2 | | 4/2010 | Alderman |
| 7,704,584 B2 | | 4/2010 | Alderman |
| 7,735,267 B1 | | 6/2010 | Ayers, Jr. |
| 7,743,573 B1 | | 6/2010 | Doberstein et al. |
| 7,814,703 B2 | | 10/2010 | Irwin |
| 7,877,955 B2 | | 2/2011 | Kelly |
| 7,877,957 B2 | | 2/2011 | Vandewater, Jr. |
| 8,178,449 B2 | * | 5/2012 | La Vietes et al. ........ 442/136 |
| 8,216,681 B2 | * | 7/2012 | Mellott et al. ........ 428/421 |
| 8,277,882 B2 | * | 10/2012 | Smith et al. ........ 427/186 |
| 8,291,660 B2 | | 10/2012 | McCary |
| 8,309,200 B2 | | 11/2012 | Zupon et al. |
| 8,497,010 B2 | | 7/2013 | Bletsos et al. |
| 8,522,509 B2 | | 9/2013 | Tracy et al. |
| 8,707,643 B1 | | 4/2014 | Kalkanoglu et al. |
| 8,782,967 B2 | | 7/2014 | Daniels |
| 8,973,310 B1 | | 3/2015 | Henderson |
| 2003/0061776 A1 | | 4/2003 | Alderman |
| 2003/0129330 A1 | | 7/2003 | Alderman |
| 2003/0167718 A1 | | 9/2003 | Alderman |
| 2003/0167730 A1 | | 9/2003 | Alderman |
| 2003/0167731 A1 | | 9/2003 | Alderman |
| 2003/0167732 A1 | | 9/2003 | Alderman |
| 2003/0230040 A1 | | 12/2003 | Shirota |
| 2004/0010983 A1 | | 1/2004 | Eshpar |
| 2004/0013854 A1 | * | 1/2004 | Zanchetta et al. ........ 428/156 |
| 2004/0148887 A1 | | 8/2004 | Di Pede |
| 2005/0063780 A1 | | 3/2005 | Thorne |
| 2005/0139126 A1 | * | 6/2005 | Khan et al. ........ 106/437 |
| 2006/0040091 A1 | | 2/2006 | Bletsos et al. |
| 2006/0096189 A1 | * | 5/2006 | Pavlansky et al. ........ 52/198 |
| 2006/0099361 A1 | | 5/2006 | Jablonka et al. |
| 2006/0266405 A1 | | 11/2006 | Lenox |
| 2006/0272281 A1 | | 12/2006 | Marshall et al. |
| 2007/0107304 A1 | | 5/2007 | Fan |
| 2007/0130850 A1 | * | 6/2007 | Miekka ............ 52/198 |
| 2008/0152867 A1 | | 6/2008 | Di Pede |
| 2008/0220714 A1 | | 9/2008 | Caruso et al. |
| 2008/0236058 A1 | | 10/2008 | Antonie |
| 2008/0248257 A1 | * | 10/2008 | Zanchetta et al. ........ 428/172 |
| 2008/0282637 A1 | | 11/2008 | Alderman |
| 2008/0312359 A1 | | 12/2008 | Alderman |
| 2009/0011171 A1 | | 1/2009 | Alderman |
| 2009/0107073 A1 | | 4/2009 | Kalkanoglu et al. |
| 2010/0037548 A1 | | 2/2010 | Kalkanolgu et al. |
| 2010/0126663 A1 | * | 5/2010 | Kalkanoglu et al. ........ 156/289 |
| 2010/0132275 A1 | | 6/2010 | Stanger |
| 2011/0000152 A1 | | 1/2011 | Botke |
| 2011/0000153 A1 | | 1/2011 | Albert |
| 2011/0027536 A1 | | 2/2011 | Malpass et al. |
| 2011/0173910 A1 | | 7/2011 | Franklin et al. |
| 2011/0209426 A1 | | 9/2011 | Pollack |
| 2011/0252723 A1 | * | 10/2011 | Devery ............ 52/173.3 |
| 2012/0047839 A1 | | 3/2012 | Walker |
| 2012/0266553 A1 | | 10/2012 | Shiao et al. |
| 2012/0285116 A1 | | 11/2012 | Walker |
| 2012/0288674 A1 | | 11/2012 | Botke |
| 2013/0000237 A1 | | 1/2013 | Kraus |
| 2013/0008113 A1 | | 1/2013 | Kraus, Jr. et al. |
| 2013/0091793 A1 | | 4/2013 | Pollack |
| 2013/0133258 A1 | | 5/2013 | Carter |
| 2013/0247490 A1 | | 9/2013 | Strait |
| 2013/0263530 A1 | | 10/2013 | Shiao et al. |
| 2014/0318038 A1 | | 10/2014 | Daniels |

FOREIGN PATENT DOCUMENTS

| | | |
|---|---|---|
| WO | 2012033816 A1 | 3/2012 |
| WO | 2013096171 A1 | 6/2013 |

OTHER PUBLICATIONS

William Miller, PhD et al. "Natural Convection Heat Transfer in Roofs with Above-Sheathing Ventilation" (14 pages).
Oak Ridge National Laboratory "Ventilation and Solar Heat Storage System Offers Big Energy Savings" (1 page).
Journal of Building Enclosure Design "Winter 2011" (5 pages).

(56) References Cited

OTHER PUBLICATIONS

Jan Kośny et al. "Sustainable Retrofit of Residential Roofs Using Metal Roofing Panels, Thin-Film Photovoltaic Laminates, and PCM Heat Sink Technology" (4 pages).
William (Bill) Miller, PhD. et al. "Task 2.5.7 Field Experiments to Evaluate Coolcolored Roofing" (33 pages).
William Miller et al.; 2008 ACEEE Summer Study on Energy Efficiency in Buildings "Next-Generation Roofs and Attics for Homes" (16 pages).
Colbond "Thermal Benefits of Roof Underlayments", 4 pgs, 2009.
Invinsa "High Density Polyiso Advantage", 2 pages, accessed 2013.
Pactiv Corporation "GREENGUARD® Roofing Recovery Board PB6", 2 pgs, 2010.
Pactiv LLC "G R E E N G U A R D® R o o f i n g R e c o v e r y B o a r d PB6FA", 2 pgs, 2013.
Elmich "VersiDrain® 8 Geo", 2 pgs, accessed 2013.
JDR Enterprises, Inc. "Foundation Wall Drainage Systems", 2 pgs, accessed 2014.
CertainTeed "Platon Air Gap Waterproofing Membrane", 4 pgs, Jul. 2011.
Delta-Drain, "Systems for Building Healthier Homes", 4 pgs.

* cited by examiner

SYSTEM, METHOD AND APPARATUS FOR THERMAL ENERGY MANAGEMENT IN A ROOF

This application claims priority to and the benefit of U.S. Provisional Patent Application No. 61/477,941, filed Apr. 21, 2011, which is incorporated herein by reference in its entirety.

BACKGROUND OF THE INVENTION

1. Field of the Disclosure

The present invention relates in general to roofing and, in particular, to a system, method and apparatus for thermal energy management in a roof.

2. Description of the Related Art

Typical residential roofs in the North America have bitumen-based roofing materials that provide satisfactory water shedding, long term durability and have aesthetic appeal. Most asphaltic roofing materials are colored in traditional dark earth tones. These colors absorb significant amounts of solar heat during hot summer times, which penetrates through the roof deck, attic and ceiling into the house. The heat penetration increases the need for cooling energy for the indoor comfort of residence occupants.

On the other hand, these types of roofing products usually have good thermal emittance and low thermal mass. These properties allow them to quickly re-radiate and lose solar heat during the night. This results in the so-called "super cooling" effect that may increase the heating energy need to maintain indoor temperatures during the night. This issue is particularly problematic for cold to moderate climate regions, and for seasons where the day and night temperature differences are significant, such as in the spring or fall seasons.

Therefore, it would be advantageous to have a roofing system that can store or manage the solar heat during the day, and then release that heat into the house during the night to improve the energy efficiency of the house. It would be a further advantage to have such a system that is compatible with current asphaltic shingle aesthetics, and can be readily applied with existing roofing techniques and construction practices.

Some asphaltic shingles have improved solar reflectance that reduces the absorption of solar heat. Although such products lower cooling energy costs, particularly in warmer climates, they are not designed for managing solar heat during the night or for significant seasonal changes. In colder climates, these products can have heating penalties due to the loss of solar heat. This is also true when radiant barriers are used to reduce solar heat flux into the attic. Radiant barriers do not capture or manage solar heat.

Other conventional solutions include ventilated decks and ventilation systems that reduce heat flux into the attic via air flows to expel heat. Again, these systems do not store or manage solar heat for the later cooler times of day. Thus, continued improvements in thermal management are desirable.

SUMMARY

Embodiments of a system, method and apparatus for thermal energy management of a roof are disclosed. For example, a roof product may comprise a thermal heat storage layer, a vent layer having channels for transferring excess heat through an entire length of the roof product, and a flame retardant to suppress fire through the vent layer. These three materials form a unitary structure. In other embodiments, the roof product combines a radiant layer, the thermal heat storage layer and the vent layer to form the unitary structure.

Embodiments of the roof products may be assembled in an abutting configuration on the roof of a building. The vent layer vents excess heat from an eave of the roof up to a ridge of the roof and out to atmosphere. In operation, the roof products may be used to manage thermal energy in the roof. The roof has a roof deck, a roof outer barrier and the unitary roof products located between the roof deck and roof outer barrier. The method comprises storing thermal heat with the unitary product during a heating cycle; venting excess heat through the unitary product; and releasing the stored thermal heat from the unitary product into the building during a cooling cycle. The unitary product may have a flame retardant for blocking venting thereof in the event of a fire.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for thermal energy management of a roof are disclosed. For example, a roof product 11 may comprise a sheet or a panel (which may be rigid; see, e.g., FIG. 1) or a flexible roll of material (see, e.g., FIG. 2) having a plurality of layers and/or materials. In some embodiments, the roof product 11 comprises a thermal heat storage layer 13, a vent layer 15 having channels 17 for transferring excess heat through an entire length L of the roof product 11, and a flame retardant 19 to suppress fire through the vent layer 15. The thermal heat storage layer 13, vent layer 15 and flame retardant 19 form a unitary structure as shown.

Figure 1:
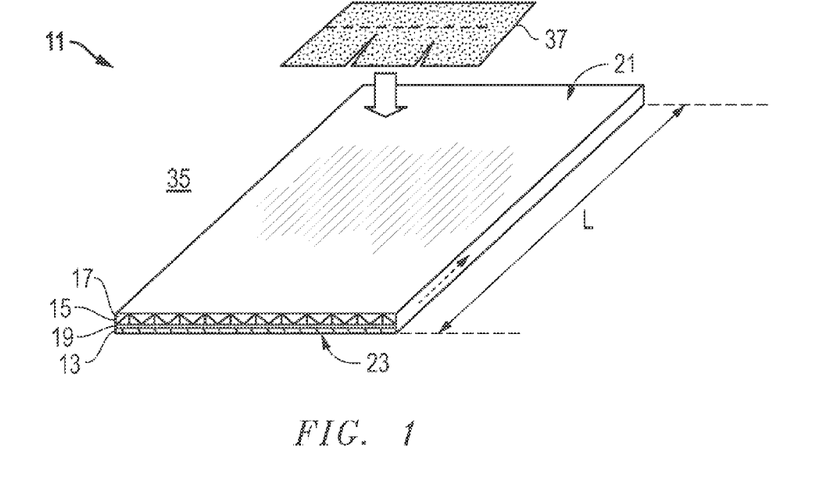
FIGS. 1 and 2 are isometric views of embodiments of a roof product.
Figure 2:
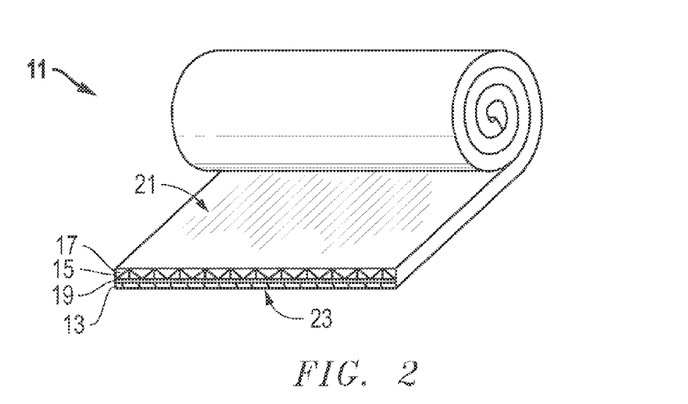
Figure 3:
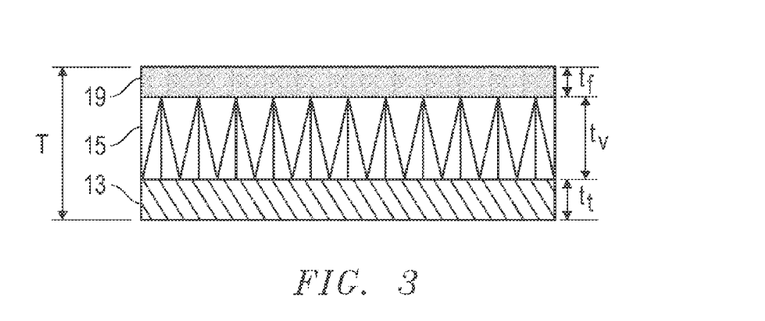
FIGS. 3-6 are schematic sectional views of additional embodiments of a roof product.

In other embodiments, the roof product further comprises outer skin layers comprising an uppermost layer 21 and a lowermost layer 23, between which are located the thermal heat storage layer 13, the vent layer 15 and the flame retardant 19. As shown in FIGS. 1 and 2, the flame retardant 19 is located between the thermal heat storage layer 13 and the vent layer 15. In FIG. 3, the vent layer 15 is located between the thermal heat storage layer 13 and the flame retardant 19.

Figure 4A:
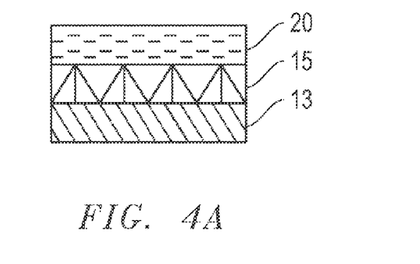
Figure 4B:
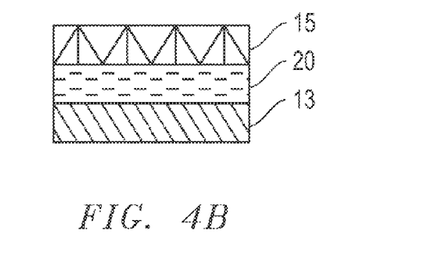
Figure 4C:
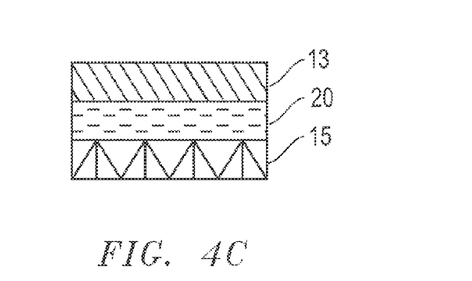

In the embodiments of FIGS. 4A-4C, the roof product 11 comprises a radiant layer 20, the thermal heat storage layer 13, and the vent layer 15 to form a unitary structure. As shown in FIG. 4A, the vent layer 15 may be located between the radiant layer 20 and the thermal heat storage layer 13. Alternatively (FIG. 4B), the radiant layer 20 may be located between the vent layer 15 and the thermal heat storage layer 13. In the embodiment of FIG. 4C, the thermal heat storage layer 13 is on top, the vent layer 15 is on the bottom, and the radiant layer 20 is in between them.

Figure 5:
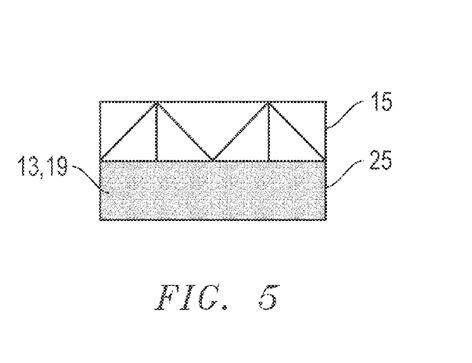

However, alternate embodiments have at least some of the layers combined together. For example, the flame retardant 19 may be combined with the thermal heat storage layer 13 (FIG. 5). The flame retardant 19 and the thermal heat storage layer 13 may each comprise media, and the media may be mixed and combined in a single layer 25 as shown. In some versions, the single layer 25 may comprise less than about 25% of the flame retardant 19, or less than about 5% to less than about 10% of the flame retardant 19.

Figure 6:
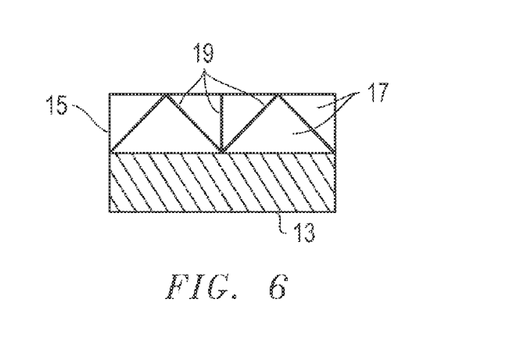
Figure 7:
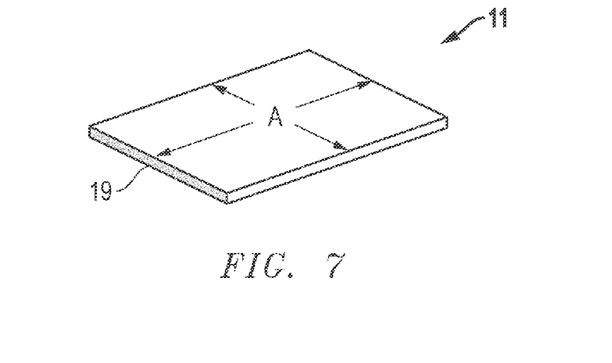
FIG. 7 is a schematic isometric view of an embodiment of a roof product.

In the embodiment of FIG. 6, the flame retardant 19 comprises materials used to form a structure for the channels 17 of the vent layer 15, such that the flame retardant 19 and the vent layer 15 are combined in a single layer. In other embodiments (FIG. 7), the roof product 11 has a planar area A, and the flame retardant 19 comprises an area that is less than the planar area A. Thus, the flame retardant 19 may be located adjacent only a portion of each of the channels 17 in the vent layer 15, rather than distributed throughout the roof product. For example, the flame retardant 19 may be located along a single edge of the roof product 11, as shown in FIG. 7.

Figure 13A:
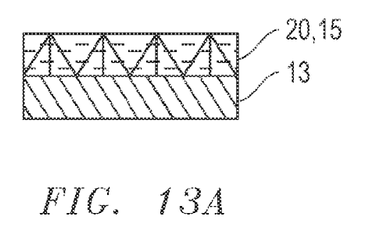
FIGS. 13A and 13B are schematic sectional views of additional embodiments of a roof product.
Figure 13B:
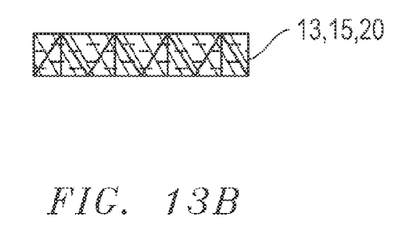

In the embodiments of FIG. 13, the radiant layer 20 and vent layer 15 may be combined in a single layer (FIG. 13A), or the radiant layer 20, thermal heat storage layer 13 and vent layer 15 may be combined in a single layer (FIG. 13B).

The flame retardant 19 also may comprise an intumescent that expands into the vent layer 17 at a desired temperature (e.g., about 175° C. to about 280° C.). For example, the flame retardant 19 may comprise media such as expandable clay, expandable graphite, intumescent silicates, hydrated metal silicates, bromated compounds, halocarbons, aluminum hydroxide, magnesium hydroxide, hydromagnesite, antimony trioxide, various hydrates, red phosphorus, boron compounds, phosphonium salts, or combinations thereof.

Still other embodiments of the roof product 11 may include an upper radiant barrier 31 (FIG. 8) and a lower moisture barrier 33, such that the roof product 11 comprises the only material located between a roof deck 35 and a roof barrier 37. The uppermost layer 31 may be UV resistant. Versions of the roof product 11 may have a thickness T of about 0.75 to 2.5 inches. For example, the thermal storage layer 13 may have a thickness $t_t$ (FIG. 3) of about 0.25 inches to about 1 inch, the vent layer 15 may have a thickness $t_v$ of about 0.25 inches to about 1 inch, and the flame retardant 19 may have a thickness $t_f$ of about 0.25 inches to about 0.5 inches. The drawings are not drawn to scale.

In still other embodiments, the intumescent may expand in the presence of fire to about 20 times its original volume.

Thus, thickness $t_f$ may comprise a ratio of about 1/20$^{th}$ of the thickness $t_v$. For example, for a thickness $t_v$ of about 0.25 inches, the thickness $t_f$ is about 0.01 inches to effectively block air flow through the vent layer 15. In addition, the roof product 11 may be configured with an overall weight per unit area in a range of about 1 pound per square foot (lbs/ft$^2$), to about 10 lbs/ft$^2$, or less than about 10 lbs/ft$^2$, or less than about 5 lbs/ft$^2$, or less than about 3 lbs/ft$^2$.

In some embodiments, the thermal heat storage layer 13 may have a heat capacity that stores solar heat during a heating cycle, and have a thermal emittance that re-radiates stored heat during a cooling cycle. For example, the heat capacity may be greater than about 100 kJ/kg, and a heat absorbing range thereof may be about 10° C. to about 50° C. In other versions, the heat capacity may be greater than about 200 kJ/kg, and the heat absorbing range may be about 20° C. to about 40° C. Other versions of the roof product include two or more thermal heat storage materials having different heat capacities and/or heat absorbing ranges.

The thermal heat storage layer 13 may comprise a solid, such as one or more phase change materials (PCM), paraffins, hydrated salts, stearic acid, ceramic media, or combinations thereof. The phase change material may comprise calcium chloride hexahydrate, sodium sulfate, paraffin, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chloride hexahydrate, potassium chloride and calcium chloride, or any combination thereof. Embodiments of the phase change material may include a mixture of strontium chloride hexahydrate, potassium chloride and calcium chloride. In other embodiments, the phase change material may comprise a supersaturated solution of calcium chloride hexahydrate.

Figure 9:
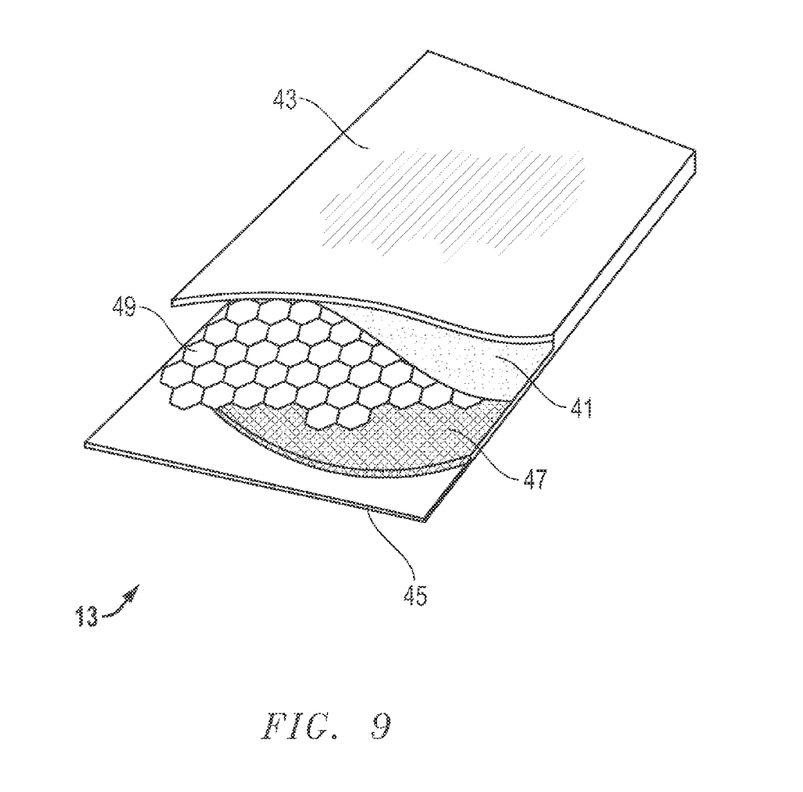
FIG. 9 is a partially sectioned, isometric view of another embodiment showing layers of a roof product.
Figure 10:
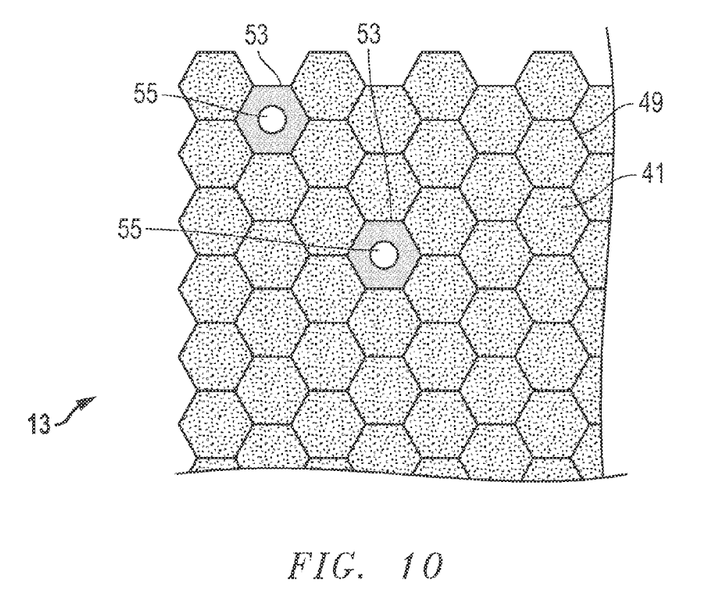
FIG. 10 is an enlarged top view of an embodiment of a roof product.
Figure 11:
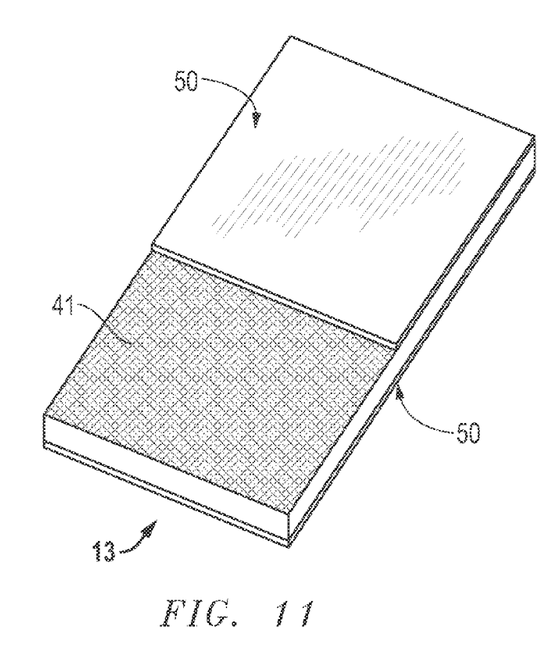
FIG. 11 is a partially sectioned, isometric view of an embodiment showing layers of a roof product.

The thermal heat storage layer 13 may comprise a powder or be in an encapsulated form with sizes that are less than about 0.5 mm in diameter. As shown in FIG. 9, the thermal heat storage layer 13 may comprise media 41 located between skin layers 43, 45, with or without an adhesive 47. In the example of FIGS. 9 and 10, the media 41 may be located in a structure 49 having cavities (e.g., an array of honeycomb cavities with vertical axes). FIG. 11 depicts an embodiment of the thermal heat storage layer 13 having outer skin layers 50 that contain heat storage media 41 in a binder matrix. Such media may be formed, for example, by extrusion, gel casting, lamination, solvent casting or extrusion coating.

Referring again to FIG. 1, the channels 17 in the vent layer 15 may have openings along the edges thereof that extend completely through the roof product 11 along length L. Each opening may have an effective area of about 0.01 in$^2$ to about 1 in$^2$, or about 0.05 in$^2$ to about 0.5 in$^2$ in other embodiments.

Figure 12A:
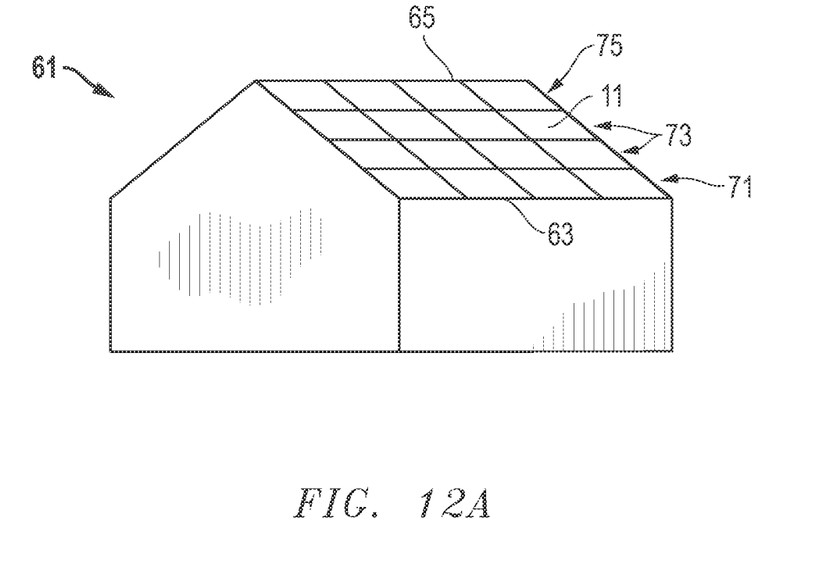
FIGS. 12A and 12B are schematic isometric views of a building having embodiments of roof products.
Figure 12B:
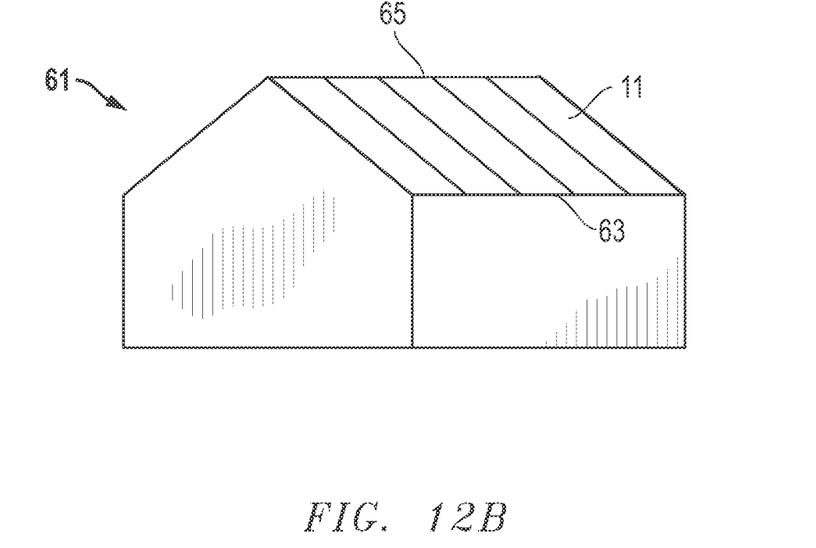

As shown in FIGS. 12A and 12B, a plurality of the roof products 11 is assembled in an abutting configuration on the roof of a building 61. FIG. 12A depicts the roof products 11 in sheet or panel form, while FIG. 12B depicts the roof products 11 in roll form. The vent layer 15 of roof product 11 is adapted to vent excess heat from an eave 63 of the roof up to a ridge 65 of the roof and out to atmosphere. The vent layers 15 inside roof products 11 may be positioned to vent excess heat via natural air flow from the lower eave 63 of the roof up to the ridge 65 of the roof. Thus, the channels 17 of the vent layers 15 may form substantially contiguous, uninterrupted air flow paths between abutting products having inlets substantially only adjacent the eave 63 of the roof and outlets substantially only adjacent the ridge 65 of the roof. The openings of channels 17 are large enough to eliminate the need for precise alignment of the inlets and outlets of adjacent, abutting products 11 such that a path for air flow is substantially unimpeded.

As shown in FIG. 12B, the roof product 11 may comprise rolls of material that extend continuously from adjacent the eave 63 to adjacent the ridge 65 to form continuous, uninterrupted air flow paths having inlets only adjacent the eave and outlets only adjacent the ridge, such that there is no air flow communication in the channels 17 between laterally adjacent rolls of the roof product 11.

Alternatively, some embodiments may include the capacity of lateral flow of air between channels with lateral openings. A plurality of roofing products 11 may be laid up on a roof deck (FIGS. 12A and 12B) with adjacent roof products 11 being arranged side-by-side, in horizontal and vertical courses (horizontal only in FIG. 12B) from a lower end 63 of the roof deck to an upper end 65 thereof. Their vent channels 17 may communicate laterally (side to side) with each other through one or more lateral openings, for providing airflow through successive horizontal courses of the roofing products 11 within in the same vertical course.

Figure 8:
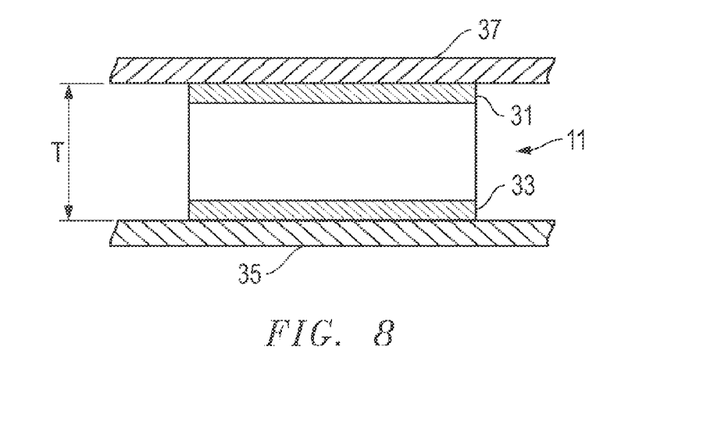
FIG. 8 is a sectional view of an embodiment of a roof product installed in a roof of a building.

As depicted in FIGS. 1 and 8, the roof product 11 is directly fastenable to the roof deck 35 of a building, and is covered by outer roof barriers 37 (e.g., shingles, tiles, membranes, etc.). Roof barriers 37 may be located on top of the roof products without substantially affecting an overall thickness of the roof products 11. In the embodiment of FIG. 10, the roof product may be provided with a plurality of cells 53 that are adapted to be penetrated by roofing fasteners 55, such as nails. The cells 53 may be void of a material 41 used to form the thermal heat storage layer 13.

In some embodiments, a kit for equipping a roof for thermal management comprises a plurality of roof products as described herein. The roof products are adapted to form continuous air vents from adjacent an eave of the roof to adjacent a ridge of the roof. Attachment means such as roofing nails or adhesive may be used to secure each of the roof products to a roof deck. At least a portion of the roof products may further comprise an intumescent zone for fire suppression within the roof products. For example, as shown in FIG. 12A, the roof products 11 may comprise one or more rows of lower edge eave elements 71, roof plane elements 73, and upper edge ridge elements 75. The fire retardant 19 may be located along at least one of the lower edge eave elements 71 and the upper edge ridge elements 75. In an alternate embodiment, the fire retardant 19 may be located in at least some of each of the lower edge eave elements 71, roof plane elements 73 and upper edge ridge elements 75. In still other embodiments, fire retardant 19 may be located at least somewhere in a path of an assembled structure so that, in the event of fire, the vent channels are blocked.

In operation, embodiments of a method of managing thermal energy in a roof of a building may comprise providing a roof having a roof deck, a roof outer barrier and a unitary product located between the roof deck and roof outer barrier; storing thermal heat with the unitary product during a heating cycle; venting excess heat through the unitary product; and releasing the stored thermal heat from the unitary product into or out of the building during a cooling cycle. The unitary product may have a flame retardant for blocking venting thereof in the event of a fire.

In some embodiments, skin layers may be added to enhance the walkable surface for roofers, particularly in wet conditions. The skin layers may be configured for walkability and may include elements such as synthetic underlayment products. In addition, they may provide some UV resistance for short term exposure (e.g., one year of UV stability) if left unprotected on the roof. Furthermore, the skin layer may be combined with a radiant barrier, such as aluminum foils, metalized films, mirrorized surfaces, etc., to reflect solar heat.

The thermal heat storage layer may comprise a desirable heat capacity that can store solar heat over an extended period of time. It may have a desirable thermal emittance that re-radiates stored heat during night time or during extended cold periods to leverage the stored solar heat for greater indoor comfort. In some embodiments, the thermal heat storage layer absorbs heat in a given range of temperatures and releases the stored heat upon cooling in a selected range of temperatures. Moreover, the roof product 11 remains flexible in lower temperatures down to about 0° C., and remains structurally sound for a roof walkable surface in higher temperatures where a roof surface temperature may exceed 70° C.

The thermal heat storage layer may perform without leakage even after being penetrated by roofing nails. For example, when a nail penetrates the structure, it goes through only a small number of capsules, leaving the vast majority of them intact over the roof area.

For embodiments of the layer with venting channels, the channels may provide sufficient openings for air flow, but not for insect infiltration or infestation. For example, a screen structure may be employed to inhibit such. The openings also are not so small that they are susceptible to clogging from airborne dust or contamination. Suitable materials for this layer may comprise thermoplastics, thermoplastic elastomers, aluminum, thermoset resins, cellulose composite, wood composites, rubbers, or their mixtures. The layer may contain fillers or functional fillers, flame retardants, or intumescent agents to reduce or block the air passages in the event of a fire. The layer may further contain biocides or fungicides to prevent or inhibit microbial growth. The layer may be constructed, for example, by industrial processes such as extrusion, injection molding, compression molding, pultrusion, lamination, or thermal forming.

Embodiments of the flame retardant reduce the risk of a fire spreading and penetrating into the underlying roof deck. This material may reduce the size of or block the air passages of the venting layer during a fire. It also may provide a charring or fire suffocating effect to prevent further spreading of fire. For example, it may provide Class A fire protection for the underlying roof deck. Suitable fire retarding media may comprise expandable clay, expandable carbon black, intumescent silicates, hydrated metal silicates, bromated compounds, halocarbons, aluminum hydroxide, magnesium hydroxide, hydromagnesite, antimony trioxide, various hydrates, red phosphorus, boron compounds, phosphonium salts, or their mixtures.

In some embodiments, the flame retardant may be combined with the thermal heat storage layer. For example, such a combination may comprise forming the flame retardant as part of the skin layer for the thermal heat storage layer, or by intermingling the flame retarding media with the heat storage media within the layer. Other versions may include a flame retardant applied as a separate accessory to the roofing product. For example, a strip of "fire stop" tape may be applied near the bottom or top of the vent channels to close the channels in the event of fire.

In other embodiments, the flame retardant may be combined with the air venting layer by incorporating the flame retardant as a skin layer, or by incorporating the flame retardant media in the materials for construction the venting layer. In addition, the flame retardant media may be dispersed or incorporated into the materials for forming the roof deck composite. Other variations to the construction of the roof deck composite for managing solar heat will become apparent to those who are skilled in the art.

An embodiment as described herein was tested against a control or conventional roofing configuration. In the test, two test huts were constructed, including an experimental but and a control hut. The effects on attic temperatures and heat flux into the ceilings were tested on both huts. The huts had identical constructions, other than their roof deck systems. The control but had a conventional roof deck construction. The experimental but had a roof deck system for managing solar heat. A summary of their constructions appears in Table 1.

TABLE 1

| | Control | Experimental |
|---|---|---|
| Roof Assembly | | |
| shingle | standard black shingle | Energy Star cool shingle |
| venting channel | No | ½" PC board |
| radiant barrier | No | yes |
| PCM | No | 29° C. PCM, 0.66 lb/ft² |
| underlayment | #30 felt | #30 felt |
| roof deck | 7/16" OSB | 7/16" OSB |
| attic insulation | R-33 fiberglass batt | R-33 fiberglass batt |
| rafter | 2×6 @ 16" O.C. | 2×6 @ 16" O.C. |
| Ceiling Assembly | | |
| joist | 2×6 @ 16" O.C. | |
| gypsum board | ½" | |
| Wall Assembly | | |
| siding | fiber cement shiplap 5/16" | |
| housewrap | DuPont Tyvek | |
| sheathing | 7/16" OSB | |
| joists | 2×4 @ 16" O.C. | |
| insulation | R-13 | |
| wall board | gypsum 5/8" | |
| window | 2'×3' PVC window | |
| Floor Assembly | | |
| exterior sheathing | Celotex sheathing ½" | |
| joists | 2×6 @ 16" O.C. | |
| insulation | R-30 fiberglass batt | |
| decking | plywood ¾" | |
| additional insulation | board insulation R-10 (2") | |
| Space Conditioning | through-the-wall AC with GE model AJCQ06LCD at capacity of 6400 BTU/hr and 9.9 EER | |

The experimental but had shingles with increased solar reflectance, an air gap of about ½", and a layer of phase change materials having a transition temperature at 29° C. The interiors of the huts were kept at constant temperature with the air conditioning and the resultant energy consumption was monitored to provide the energy impact by the two different types of roof deck systems.

The huts were placed in an outdoor environment and spaced apart to ensure no shadowing effects on each other. The rooms inside the huts were kept constant at 68° F. with an air conditioning unit during the daytime. The huts were not occupied nor contained any furniture. Each but had a 2'×3' window to simulate their solar heat gain into the rooms. The roof shingle temperature, roof deck temperature, attic temperature at inner side of the roof deck and at attic floor, ceiling temperature, room temperature, and wall temperatures were measured by thermistors and thermocouples. The energy consumption, start time, and the run duration of the AC units were recorded to determine the energy impact. The data was collected with a data acquisition system and computer located inside each hut.

Figure 14:
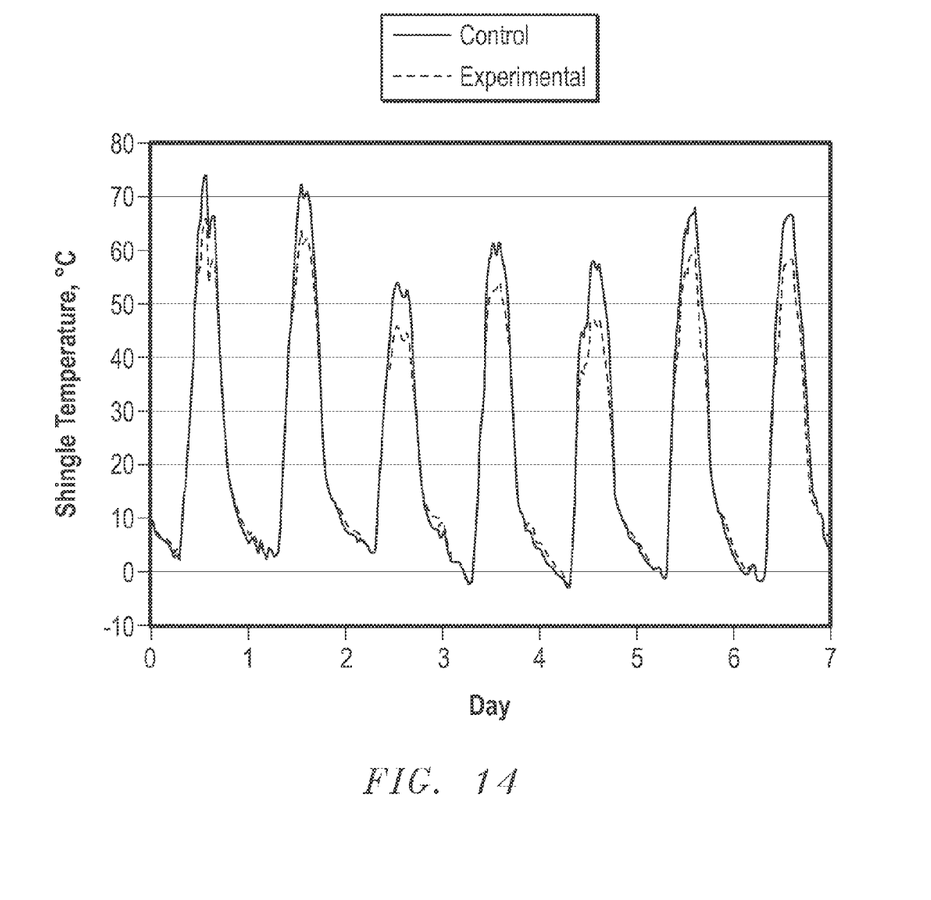
FIGS. 14-16 depict plots of performance comparing a conventional roof construction to an embodiment of a roof construction.
Figure 15:
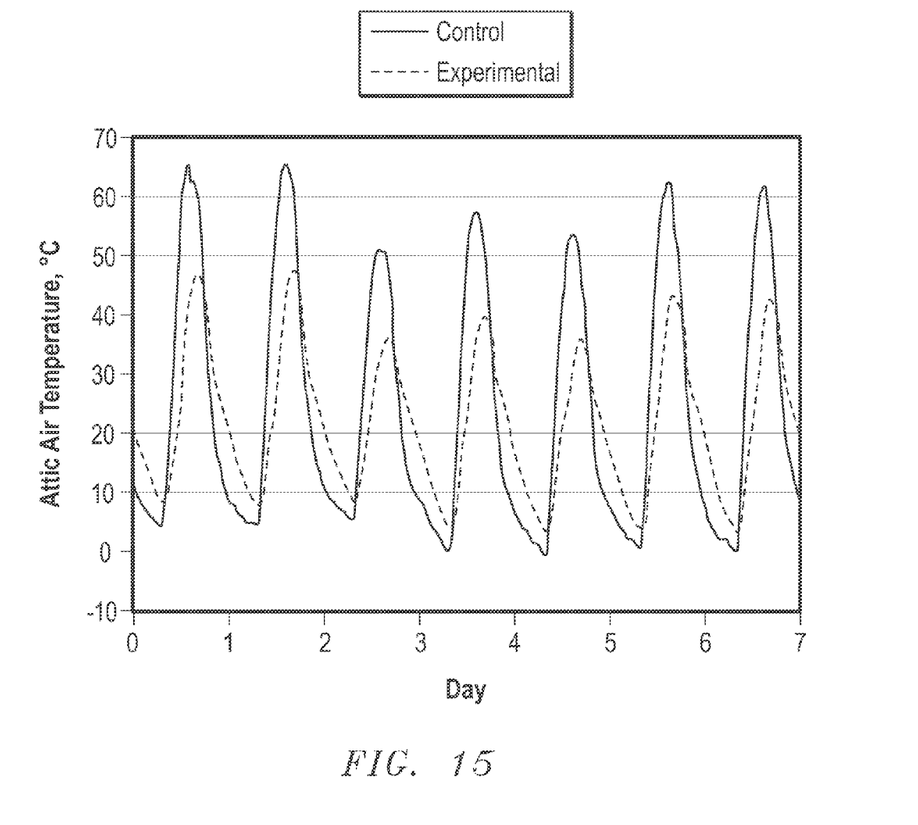
Figure 16:
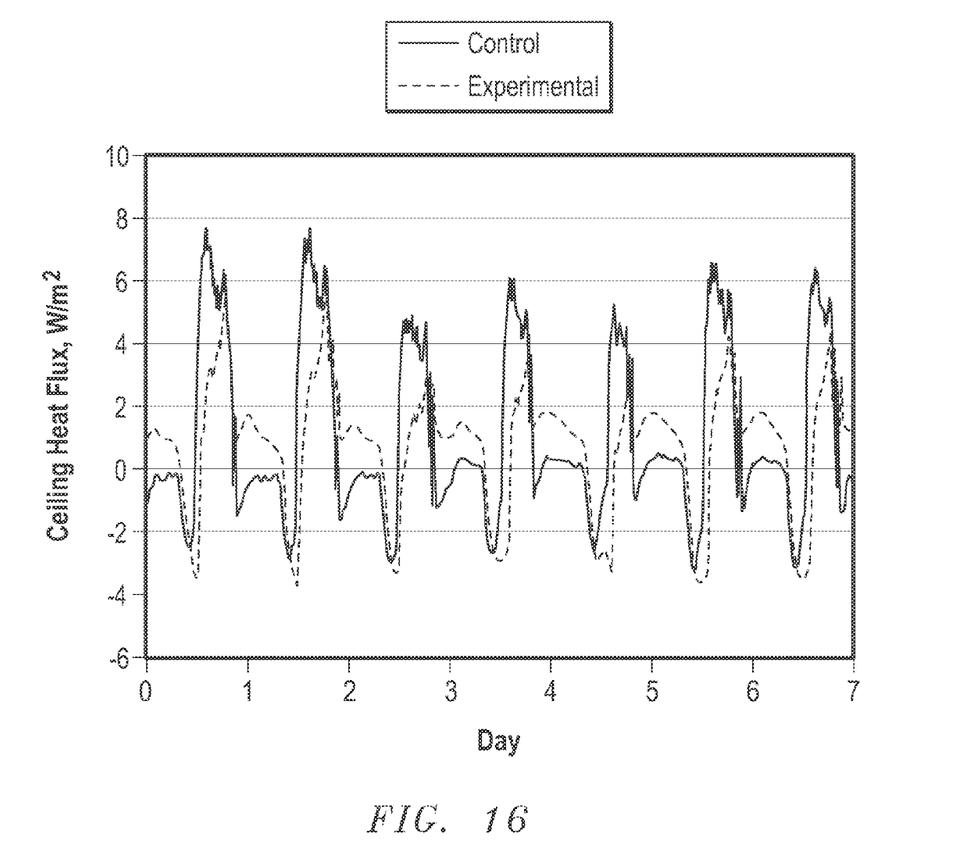

Data was collected in both huts over the course of a continuous week. The results are shown in FIGS. 14-16. Comparing the temperatures of the roofing shingles (FIG. 14), a reduction of about 10° C. was achieved by the experimental but with the solar heat management roof deck system. Moreover, the experimental hut's attic air temperatures (FIG. 15) show a significant reduction of about 20° C. in peak temperatures, and a shift in peak temperatures into evening hours. This reduction and shifting in peak temperatures had a significant delaying effect for reducing the peak hour energy demands, as well as significantly reducing the AC load. The overall AC energy consumption was reduced by 25% from a daily average of 14.6 kWh in the control hut, to 11.1 kWh in the experimental hut. The daily ceiling heat flux results are shown in FIG. 16, where a reduction of about 35% in peak heat flux is observed.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roof for a building, comprising:
a roof deck;
a plurality of roof products, each comprising an underlayment that forms a unitary structure, the roof products are mounted directly to the roof deck, and each of the roof products comprising a radiant layer, a thermal heat storage layer, a vent layer having channels to transfer excess heat through an entire length of the roof product, the channels of the vent layers form contiguous, uninterrupted air flow paths between abutting roof products from an eave of the roof to adjacent a ridge of the roof;
the thermal heat storage layer comprises a media having a heat capacity that stores solar heat during a heating cycle, has a thermal emittance that re-radiates stored heat during a cooling cycle, and the media is located in a structure having an array of cavities with vertical axes that are perpendicular to axes of the channels in the vent layer;
a flame retardant comprises materials used to form a structure for the channels of the vent layer, such that the flame retardant and the vent layer are combined in a single layer;
each roof product has outer skin layers comprising an uppermost layer and a lowermost layer, between which is located the unitary structure, such that the thermal heat storage layer, vent layer and flame retardant are inside the roof product;
each roof product comprises a rigid sheet, a rigid panel or a flexible roll;
roof shingles mounted to the roof products, such that the roof products are positioned between the roof deck and the roof shingles; and
a plurality of cells in each thermal heat storage layer penetrated by roofing fasteners, and the cells are void of material used to form the thermal heat storage layer.

2. The roof of claim 1, wherein the thermal heat storage layer and the vent layer are combined together in a single layer having a first boundary and a second boundary, and each of the thermal heat storage layer and the vent layer extend to both the first boundary and the second boundary.

3. The roof of claim 1, wherein the flame retardant comprises an intumescent that expands into the vent layer at a temperature in a range of about 175° C. to about 280° C.

4. The roof of claim 1, wherein the flame retardant comprises at least one of expandable clay, expandable graphite, intumescent silicates, hydrated metal silicates, bromated compounds, halocarbons, aluminum hydroxide, magnesium hydroxide, hydromagnesite, antimony trioxide, various hydrates, red phosphorus, boron compounds, phosphonium salts, or combinations thereof.

5. The roof of claim 1, wherein the roof product has a planar area and the flame retardant comprises an area that is less than the planar area, such that the flame retardant is located adjacent only an edge portion of each of the channels in the vent layer.

6. The roof of claim 1, wherein the thermal heat storage layer comprises at least one of phase change materials (PCM), paraffins, hydrated salts, stearic acid, ceramic media, or combinations thereof, and the PCM is selected from a group consisting of: calcium chloride hexahydrate, sodium sulfate, $Na_2SO_4.10H_2O$, $CaCl_2.6H_2O$, $Na_2S_2O_3.5H_2O$, $Na_2CO_3.10H_2O$, $NaHPO_4.12H_2O$, a mixture of strontium chloride hexahydrate, potassium chloride, calcium chloride, or a mixture thereof.

7. The roof of claim 1, wherein the channels in the vent layer have openings, and each opening has an effective area of about 0.01 to 1 $in^2$.

* * * * *